(12) United States Patent
Khanzadian (10) Patent No.: US 10,119,634 B1
(45) Date of Patent: Nov. 6, 2018

(54) MULTI-LAYER REMOVABLE DUCT LINERS

(71) Applicant: Sarkis Khanzadian, Fresno, CA (US)

(72) Inventor: Sarkis Khanzadian, Fresno, CA (US)

( * ) Notice: Subject to any disclaimer, the term of this patent is extended or adjusted under 35 U.S.C. 154(b) by 0 days.

(21) Appl. No.: 15/649,531

(22) Filed: Jul. 13, 2017

(51) Int. Cl.
| | |
|---|---|
| *F16L 9/22* | (2006.01) |
| *F24F 13/02* | (2006.01) |
| *B32B 1/08* | (2006.01) |
| *B32B 15/04* | (2006.01) |
| *F16L 9/14* | (2006.01) |
| *F16L 9/153* | (2006.01) |
| *F16L 9/147* | (2006.01) |
| *F16L 9/00* | (2006.01) |
| *F16L 9/02* | (2006.01) |
| *F16L 9/18* | (2006.01) |

(52) U.S. Cl.
CPC ...... *F16L 9/22* (2013.01); *B32B 1/08* (2013.01); *B32B 15/043* (2013.01); *F16L 9/003* (2013.01); *F16L 9/02* (2013.01); *F16L 9/14* (2013.01); *F16L 9/147* (2013.01); *F16L 9/153* (2013.01); *F16L 9/18* (2013.01); *F24F 13/02* (2013.01); *F24F 13/0281* (2013.01); *B32B 2597/00* (2013.01)

(58) Field of Classification Search
CPC ..... F16L 9/003; F16L 9/02; F16L 9/14; F16L 9/147; F16L 9/153; F16L 9/18; F16L 9/22; F24F 13/02; F24F 13/0281; B32B 1/08
See application file for complete search history.

(56) References Cited

U.S. PATENT DOCUMENTS

| | | | |
|---|---|---|---|
| 4,101,700 A | 7/1978 | Ray et al. | |
| RE31,275 E * | 6/1983 | Wirt | F01N 13/20 181/224 |
| 4,573,715 A | 3/1986 | Armbruster | |
| 5,007,670 A | 4/1991 | Wise | |
| 5,205,365 A * | 4/1993 | Quintana | E21B 4/18 166/380 |
| 5,460,206 A | 10/1995 | Sansoucy | |
| 5,762,109 A | 6/1998 | Matthews et al. | |
| 6,410,112 B1 | 6/2002 | Hatfield | |
| 7,112,350 B1 | 9/2006 | Roberts | |
| 7,140,396 B2 | 11/2006 | Mota et al. | |
| 7,182,104 B2 | 2/2007 | Washburn | |
| 2003/0236403 A1 | 12/2003 | Calzavara et al. | |
| 2006/0070521 A1 | 4/2006 | Stark et al. | |
| 2007/0295422 A1 | 12/2007 | Ostan et al. | |
| 2008/0280086 A1 | 11/2008 | Sheridan et al. | |
| 2013/0025929 A1 * | 1/2013 | Dower | G02B 6/4459 174/502 |
| 2013/0295303 A1 | 11/2013 | Parks et al. | |

* cited by examiner

*Primary Examiner* — Walter Aughenbaugh
(74) *Attorney, Agent, or Firm* — NetLawyers LLP; P. J. Benedict O'Mahoney (57) ABSTRACT

An apparatus comprising a multi-layer duct liner which can be inserted into existing duct systems such as HVAC system ducts. In facilities where micro-organisms are a concern, the linings may be chemically treated. When it is time to clean the ducts, the innermost lining is removed by detaching it from the remaining layers and removing it from the system.

16 Claims, 9 Drawing Sheets

MULTI-LAYER REMOVABLE DUCT LINERS

FIELD OF INVENTION

The present invention relates to ducts and duct systems used in industrial, commercial and residential heating, ventilation and air conditioning systems. More specifically, the present invention relates to removable duct liners which may be removed from ducts after use.

BACKGROUND OF THE INVENTION

A forced-air heating, ventilation and air conditioning system depends on a system of ducts to provide a controlled path for distributing heated or cooled air throughout the home. Typically, HVAC duct systems are made of sheet metal, but other rigid heatproof materials such as fiberglass or insulated plastic may be used.

Air ducts require periodic cleaning and maintenance in order to maintain acceptable indoor air quality. Cleaning may be part of preventive maintenance or it may be required to improve performance of the HVAC system. It may also be required to reduce or control micro-organisms. Micro-organisms can pose a health threat to people with allergies and patients in medical facilities with exposed wounds.

Duct systems are difficult to clean. Duct systems are very difficult to clean effectively. Duct systems are expensive to clean. Duct systems with flexible ducts are difficult to clean with conventional large scrubbing brushes. Duct systems used in general commercial applications must be maintained with some regularity. Duct systems used in specialized applications with specific requirements, such as healthcare facilities, will have more stringent maintenance requirements. Duct systems used in food preparation applications will have different maintenance requirements due to the combustion risks associated with grease build up. Restaurant kitchen stove/range hood vents and ducts are generally installed vertically, yet still accumulate considerable amounts of grease. A grease duct is a duct that is specifically designed to vent grease-laden vapors from commercial cooking equipment such as stoves, pizza ovens, deep fryers and woks to the outside of a building or mobile food preparation trailer. Grease ducts are regulated both in terms of their construction and maintenance, forming part of the building's passive fire protection system. Even the cleaning schedule is typically dictated by the fire code and evidence of compliance must be kept on file by the owner.

U.S. Pat. No. 4,101,700 to Ray et al. for "Thermally Insulating Duct Liner" discloses a flexible thermally insulating duct liner comprising a fibrous thermal insulation layer having an organic fibrous layer having an open structure bonded to its working face, the working face being thereafter coated with a flame retardant vinyl polymer containing coating. This duct liner is intended to be inserted into ducts, but does not disclose multiple layers which can be removed serially.

U.S. Pat. No. 7,140,396 to Mota et al. for "Air duct containing an organic liner material" discloses an air duct suitable for conducting a flow of air. The air duct includes a central layer formed from fiber glass. The central layer has an inner surface and an outer surface. The air duct also includes a liner layer arranged adjacent to the inner surface of the central layer. The liner layer is formed from an organic material and is substantially free of fiberglass, or is formed from polyester and rayon. The central layer and liner layer are arranged to define a channel for conducting a flow of air. While the duct liner is comprised of multiple layers, the multiple layers comprise a single duct liner, rather than multiple duct liners.

U.S. Pat. No. 4,573,715 to Armbruster for "Temporary duct liner interconnect device" discloses a duct liner interconnecting device for temporarily interconnecting the ends of sections of duct liner includes a pair of complementary semi-cylindrical elements hinged together along one edge for movement from an open position in which the elements are side by side to a closed position in which the elements form a short tubular member with a longitudinal channel to receive the ends of duct liner sections to be interconnected, a pair of arcuate spring clips pivotally attached to one of the elements releasably latch the elements together in the closed position, and a tapped aperture in one of the elements receives a lubrication fitting to allow the introduction of lubricant into the duct liner to facilitate pulling of lightguide cable through the duct liner.

U.S. Pat. No. 5,762,109 to Matthews et al. for "Duct with replaceable insulating duct liner and method of maintaining the same" discloses a duct for gas flow applications with a replaceable insulating duct liner that can be axially inserted into and removed from a tubular shell of the duct. Preferably, the replaceable insulating duct liners comprise fibrous and/or cellular insulation materials. Duct systems using duct sections with replaceable insulating duct liners can be maintained by removing duct sections from the system; removing the replaceable insulating duct liners from the duct sections; inserting new replaceable insulating duct liners into the duct sections; and replacing the duct sections into the duct system. This duct liner is intended to be inserted into ducts, and is removable, but does not disclose multiple duct liners which can be removed serially.

U.S. Patent Application No. 20130295303 to Parks et al. for "Duct Liner" discloses a duct liner that includes an insulation layer and a facing. The insulation layer having a first edge surface, a second edge surface that is spaced apart from the first edge surface, and a first and second face surfaces that extend from the first edge surface to the second edge surface. The facing is disposed on the first face surface, such that the first face surface is entirely covered by the facing. The facing is disposed on the first and second edge surfaces, such that the first and second edge surfaces are entirely covered by the facing. Two spaced apart strips of the facing are disposed on and cover a portion of the second face surface adjacent to the first and second edge surfaces, such that a portion of the second face surface between the strips is uncovered by the facing.

U.S. Patent Application No. 20060070521 to Stark et al. for "Removable duct liner" discloses a porous polymeric membrane layer and, optionally, a support layer, in which the article is a duct liner adapted to be removably positioned within a porous air duct. The liner may also be used in conventional metal and plastic ducts to reduce cleaning frequency. In another aspect, the invention is a porous air duct comprising: a liner comprising a porous polymeric membrane and, optionally, a support layer; and an openwork conduit, said liner disposed within the openwork conduit. This duct liner is intended to be inserted into ducts, and is removable, but does not disclose multiple duct liners which can be removed serially.

U.S. Patent Application No. 20070295422 to Ostan et al. for "Flexible Sleeve Liner for a Convolute Duct" discloses an air induction system wherein the outlet air assembly includes a sleeve-lined convolute duct. A sleeve liner is disposed within a convolute duct which spans the convolutes, wherein an attached end of the sleeve liner is attached to a non-convolute portion of the convolute duct, wherein a free end is freely slidable in the convolute duct, and wherein the free end of the sleeve liner and the attached end of the sleeve liner each serve as a sealing cuff whereby air flow is laminar throughout irrespective of the convolutes.

While the art describes various implementations of removable duct liners wherein the duct liners can be removed and replaced with a new duct liner, what is needed is a multi-layer duct liner wherein a single multi-layer duct liner can be installed, and then layers of the multi-layer duct liner can be removed as they are used, saving time and effort required to install a new duct liner.

SUMMARY OF THE INVENTION

In accordance with the present invention, there is provided an apparatus comprising a concentrically aligned multi-layer duct liner which can be inserted into existing HVAC and other duct systems. A multi-layer duct liner can be used to mitigate molds and allergens in the host structure. In facilities where micro-organisms are a concern, the linings may be chemically treated. When it is time to clean the ducts, the innermost lining is removed by detaching it from the retaining locations, and remaining layers, and removing it from the system.

The invention provides a system and method that enables quick, easy, inexpensive and effective maintenance and cleaning of duct systems, significantly reducing ongoing costs associated with maintaining HVAC and other duct systems. For example, a multi-layer duct liner may be used for grease ducts, thereby reducing the need for steam cleaning of the duct system, and allowing for normal operations to continue with minimal down time. As grease will build up regardless the interior duct material, the multi-layer duct liner allows for effective, quick, and complete removal of said fire hazard. Materials used in a multi-layer duct liner for these purposes would meet the heat resistant requirements for the environment at hand; e.g., from the family of thermoplastics.

The invention also eliminates leakage in duct systems. Between 10-30% of air moving through forced air duct systems is lost by leakage through the duct system. Consequently, air is not efficiently delivered to where it is needed. Also, leaky return ducts add load, reduce equipment efficiency, increase wear, and can pull air from uncontrolled spaces which can cause humidity problems and introduce contaminants. The invention prevents this leakage because each layer of the multi-layer removable duct liner provides an isolated member independent of the existing duct system. The multiple layers significantly reduce the leakage of forced air through duct systems.

BRIEF DESCRIPTION OF THE DRAWINGS

A complete understanding of the present invention may be obtained by reference to the accompanying drawings, when considered in conjunction with the subsequent, detailed description.

DETAILED DESCRIPTION

In one embodiment of the present invention, the multi-layer duct liner comprises a plurality of concentrically aligned duct liners, stacked upon each other, with retaining loops on, and at each end of, each concentrically stacked duct liner adapted to be retained with the adjacent duct liners, at their origin and terminus points e.g., plenum, register, or return air duct.

To effect the removal of the spent liner, the innermost duct liner is removed by disengaging the retaining loops connecting the innermost duct liner with the penultimate innermost duct liner, and internally removing the innermost duct liner by pulling it though the duct from one of the duct egresses. In one embodiment of the invention, the retaining loops are located at a minimum of four locations around the perimeter of a duct wherein the perimeter could be sealed with adhesive tape extending from each individual duct liner, to be affixed with removable tape, so as to release from remaining layers. After removal of the innermost duct liner, the penultimate innermost duct liner becomes the fresh and clean innermost duct liner and continues to capture dust, debris and micro-organisms, or grease. This process continues until the last innermost duct liner is removed, at which point a new multi-layer duct liner can be installed at the time of the last removal. The multi-layer duct liners are adapted to accommodate T and Y joints, round to rectangular transitions, or other configurations as may be required in accordance with the cubic volume provided by the outer metal or flexible ducting. T, Y, or other junction shapes can be formed thermally from folded plastic sheets. Plastic sheets are folded, then cutout to the pattern desired, then heat melded around the perimeter of the cutout pattern, to form seams with openings as designed for various shapes. For example, a T section, with a width preselected for a round diameter would be shaped in the form by a cutting die, from a folded plastic sheet, thereafter removing the excess fold. Said junction shapes can be affixed to in tandem multi-layer lengths/sections either thermally, or with use of adhesive connectors which would overlap to join and attach succeeding duct joints/runs/lengths, as an attachment means. Where said joints are comprised of the pull/lead wire sections for each liner layer, said leads would be engaged/connected at such T, Y, or other junction shape connection points, ingress/egress of fitting/shape/junctions.

In one embodiment of the present invention, the multi-layer duct liners are made from a thermoplastic material such as polyethylene or cross-linked Teflon, or other appropriate materials, with a thickness ranging from 1 to 20 millimeters.

In one embodiment of the present invention, the multi-layer duct liners are between 20' and 60' in length, but are not limited in length, except as air flow standards for a particular system may direct, and as are distributed throughout the duct system. The multi-layer duct liners are flexible, and adapted to conform to duct systems of all shapes and sizes. Generally speaking, the multi-layer duct liner will comprise a minimum of four layers; however additional layers are possible from calculation of system requirements by professional system engineers. In one embodiment of the present invention, each duct liner is color coded with a different color. Color coding, facilitates tracking of cleaning and determination as to when a multi-layer duct liner will need to be replaced, with a new multi-layer duct liner.

In one embodiment of the present invention, the duct liners are not sensitive to thermal changes and/or thermal thresholds; (presently polyethylene is commercially used in applications where it is subjected to both boiling and freezing temperatures. Such temperature extremes are not usually encountered in standard HVAC systems (40 F-90 F). Where extreme temperatures are present, and a level of air quality must be had, liner material specific to the required operating temperature outside the norm, can be especially provided from the family of thermoplastic materials. In one embodiment of the present invention, the duct liners are treated on the interior surface such that they are designed to attract and capture airborne debris. Application of chemicals can be specific to neutralizing pathogens, or specifically to capturing airborne debris, or both. Application would occur during initial installation, to the inner most first layer, and thereafter as liners are discarded, the succeeding new inner layer would be treated with said chemicals. Chemical spray would be in accordance with the special needs of the facility being serviced e.g., Hospitals, Elder Care Facilities, Multi-Family residential structures, industrial facilities, and the like. Chemicals used to attract or capture debris may be comprised of elements with enhanced adhesive qualities, i.e. sticky.

Multi-layer duct liners can be incorporated into new systems, or can retrofit existing residential, commercial, industrial or medical HVAC systems.

Other embodiments of the present invention provide an adaptation for duct systems with exposed elements, such as sheet metal screws used to connect sections of duct, that could damage or tear duct liners. Sheet metal screws can extend interior to the ducting, and are usually self-tapping and very sharp. To prevent these screws from damaging the liners when being pulled through during installation, one embodiment provides for a polyurethane foam to be applied to cover/ball over the screw tips, so as to harden with a smooth surface. One embodiment provides for a liner/material that coats the tips of the screws as it is pulled through a ducting system so that the material is scored by the screws, and as a result are coated, then dry to form a blunt, rounded, ball/tear shaped finial/terminus. In this embodiment, the screw tips become encapsulated. In one embodiment, a video guided pre-installation spot treatment for every screw in a system is provided, with materials such as a polyurethane foam spray. In one embodiment, the duct liners are not expanded or inflated when they are initially pulled through a duct system, thereby minimizing the risk of being damaged from exposed elements.

In one embodiment of the present invention, the multi-layer duct liner is installed in a duct system such that all junctions and points of egress and ingress are secured. As the duct system is activated, air enters into the duct system and the multi-layer duct liner is inflated to the extent of the interior diameter of the duct.

In one embodiment of the present invention, the multi-layer duct liners are connected to successive multi-layer duct liners such that when the multi-layer duct liners are pulled through a duct system they would act much like paper towels that when dispensed, passing through a small diameter opening. The multi-layer duct liner is taut, when pulled down, and the diameter of the multi-layer duct liner material is decreased to ±some measure near that of the opening (10% the diameter of the duct itself). This would also minimize to some extent the chance that the multi-layer duct liners would come in contact with exposed elements in the duct system.

In one embodiment of the present invention, chemical treatments are applied to the liner material, including coatings that attract debris causing it to be captured/trapped. Such an application to the interior liners would not be affected by electrostatic charges that may be either inherent or present to the interior air system.

In one embodiment of the present invention, there are the plurality of liners, there is a mechanism for sealing the receiving end of the liner in a host duct system, there is a mechanism for sealing the open end of the liner in the host duct system, there is a mechanism for removing a spent liner; and there is a mechanism for removing the spent liners from the immediate area. In another embodiment, the layers of the multi-layer duct liner are impervious to damage and tearing, and may be included with catalytic elements for biodegradation, e.g. bacteria. In one embodiment of the invention, the mechanisms used for sealing of liners, and removal of liners can be either mechanical, or electrically operated. In one embodiment of the invention, activation prior to use seals receiving end of liner, either with heat/melding, or epoxy resins. In one embodiment, liners can be of bio-plastic materials compatible to aerobic bacteria for decomposition of waste. In one embodiment of the invention, the multi-layer duct liner can be installed in a waterless toilet system, thereby eliminating the need for water as a transport vehicle for human waste, and the use of caustic chemicals for purposes of cleaning the receptacle.

In one embodiment of the present invention, the layers of the multi-layer duct liner are thin and have minimal weight which can be installed as collapsed sheets, but which during operations of the system, assuming a cold day using heat, the liners would expand on energizing the system, and the constant heat would serve to form the liners more to the inside perimeter of the duct. When the system stops operation, the liners would remain in their expanded state, as the interior of the duct and liners became cold, thereby remaining relatively rigid. The same would be true if it was a warm day requiring air conditioning; the liners would expand during operation, and become cold when the system is turned off, the liners would remain in the expanded state; the side walls and base layers would serve to strengthen the configuration. In one embodiment, the multi-layer duct liner would be strictly engineered to tolerances appropriate between layers, sweeps for radii, and weight according to specifications designed for each individual HVAC system.

Figure 2:
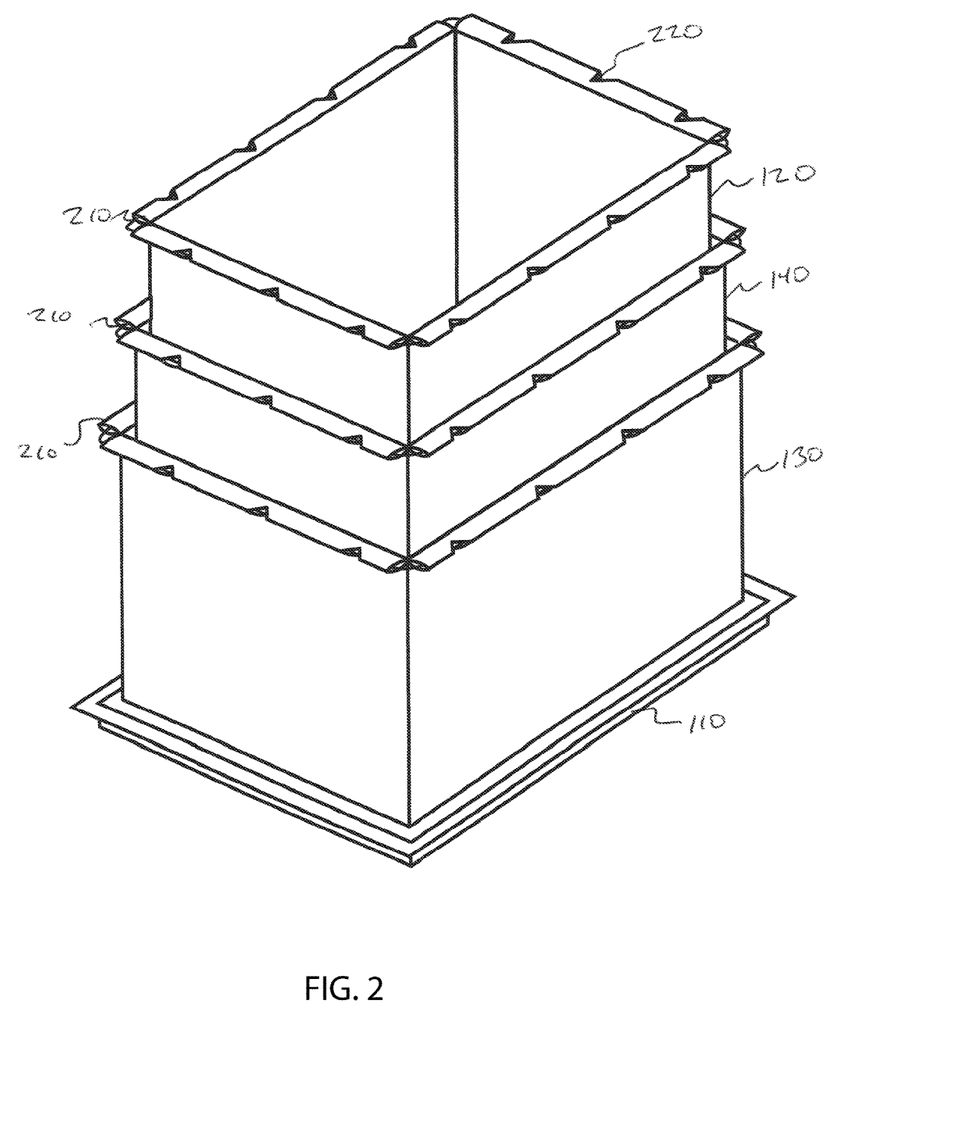
FIG. 2 is an oblique view of the end of a duct with a multi-layer duct liner.
Figure 3:
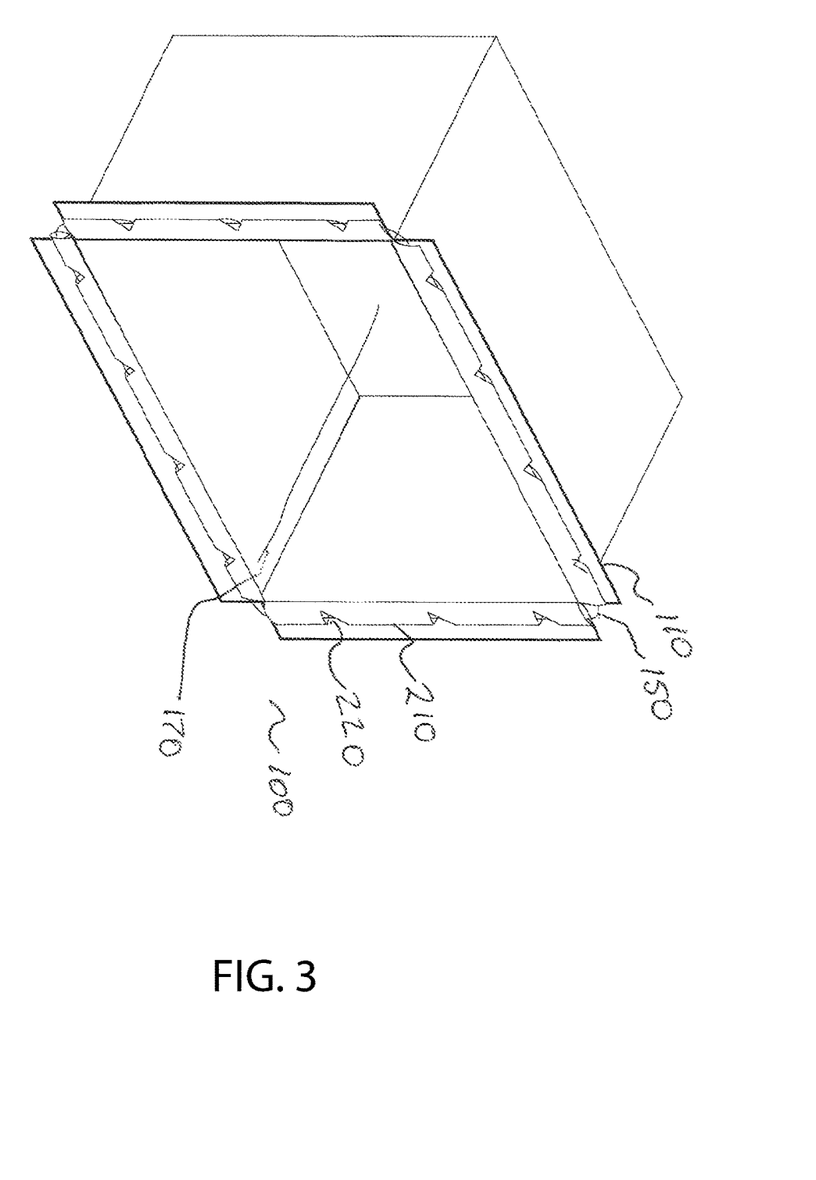
FIG. 3 is an oblique view of the end of a duct containing a multi-layer duct liner with pull leads.
Figure 4:
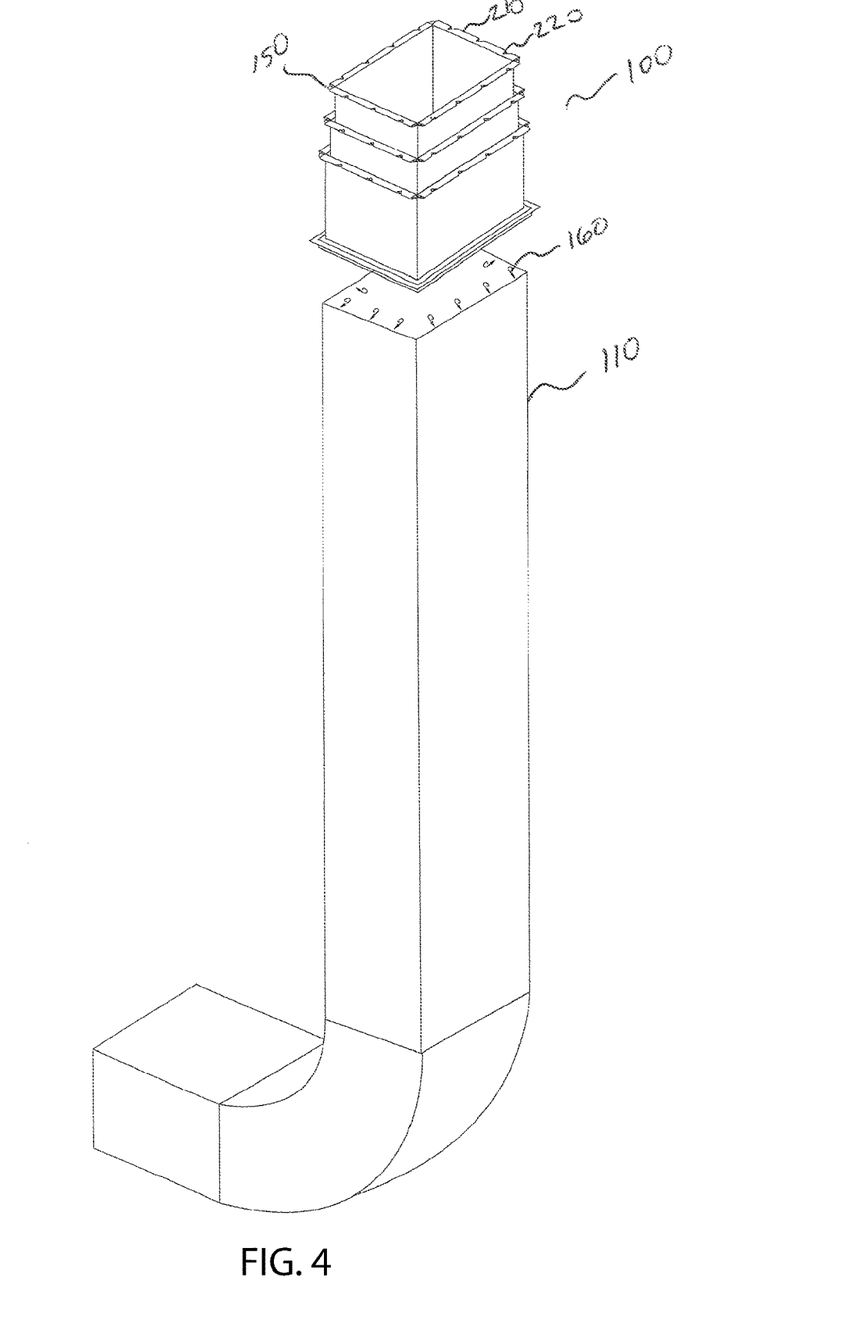
FIG. 4 is an oblique view of a multi-layer duct liner with hooks.

Implementations of multi-layer duct liners are shown in FIGS. 2-4. In one embodiment of the present invention, multiple liners can be equipped with pre-installed pulling string or lead, to be used at the time for removal to the inner most dirty layer, precluding the necessity of fishing pull lines to each register/terminus location, at each scheduled replacement time.

In another embodiment, the multi-liners system can be used in a waterless toilet application using the same principles. Conventional toilets flush up to 20 percent of the world's drinking water. In developing countries, waterless toilets can provide sanitation on little infrastructure and are helpful in regions prone to droughts.

Figure 1:
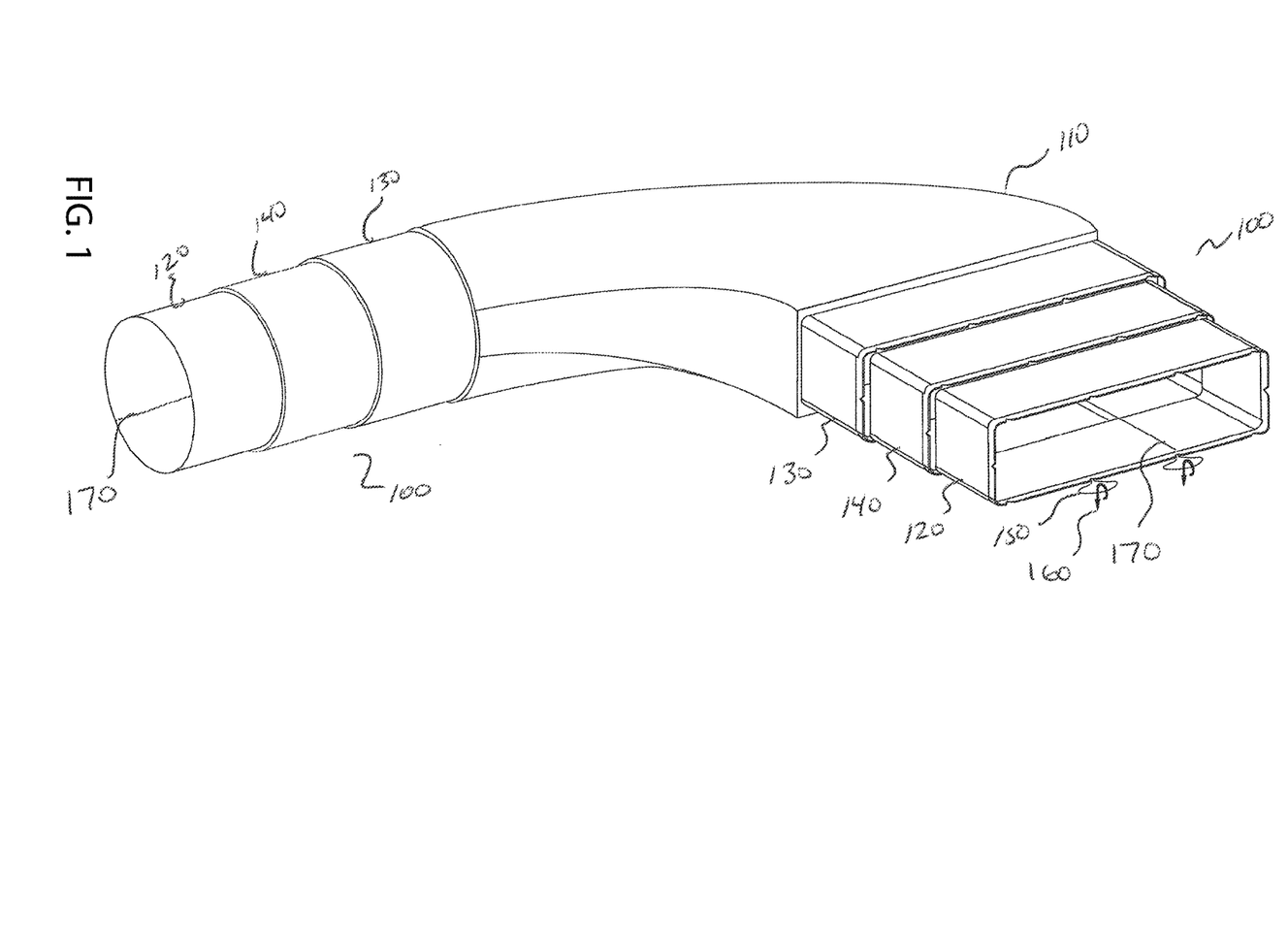
FIG. 1 is an oblique view of a multi-layer duct liner.

Turning now to FIG. 1, shown is a duct 110 with a multi-layer duct liner 100 extending from either end in which the individual layers are extruded for visibility. In one embodiment of the present invention, the multi-layer duct liner 100 is comprised of three layers in which the inner duct liner 120 is the innermost liner and is surrounded by the medial duct layer 140, which in turn is surrounded by the outer duct liner 130, which is the outermost liner. Shown on the proximal end of the inner duct liner 120 are two retaining loops 150 and two hooks 160. Generally, each layer of the multi-layer duct liner 100 would have a number of duct liner notches through which the retaining loops would protrude from the liner such that the hooks 170 can be affixed to the orifice of a duct 110 and hooked over the retaining loops 150, thereby securing the multi-layer duct liner to the duct. Also shown is the pull lead 170 which may be attached to the proximal end of the liner, or to the pull lead at the proximal end of the liner, in this case the inner duct liner 120. In one embodiment of the present invention, a pull lead 170 is attached to a proximal end the inner duct liner 120 and runs the length of inner duct liner 120 so that the end of the pull lead 170 is accessible from the distal end of the inner duct liner 120; another pull lead 170 is attached to a proximal end the medial duct liner 140 and runs the length of the medial duct liner 140 so that the end of the pull lead 170 is accessible from the distal end of the inner duct liner 140; and a pull lead 170 is attached to a proximal end the outer duct liner 120 and runs the length of outer duct liner 130 so that the end of the pull lead 170 is accessible from the distal end of the outer duct liner 130. In embodiments where there are more layers in the multi-layer duct liner 100, each such layer would have a pull lead 170 attached to a proximal end such layer which runs the length of such layer so that the end of the pull lead 170 is accessible from the distal end of such layer.

As can be seen in the FIG. 1, the proximal end of the multi-layer duct liner 100 is rectangular comporting with the shape of the orifice of the proximal end of the duct 110, and the distal end of the multi-layer duct liner is round comporting with the shape of the orifice of the distal end of the duct 110.

Turning now to FIG. 2, shown is the orifice of a duct 110 with a multi-layer duct liner 100 extending therefrom in which the individual layers are extruded for visibility. Each layer of the multi-layer duct liner 100, in which the embodiment of FIG. 2 comprises an inner duct liner 120, a medial duct liner 140 and an outer duct liner 130, has a duct liner lip 210 with a plurality of duct liner notches 220. The duct liner lip 210 is created by folding a small portion of the layer back on itself and cutting a series of notches in the layer. Prior to folding back the small portion of the layer, a retaining loop is wrapped around the end of the layer such that when the small portion of the layer is folded back on itself and secured by a heat sealing or tapping process, the retaining loop is secured to the end of the layer, and the retaining loop is accessible through the duct liner lip notches 220. In one embodiment, the duct liner lip notches 220 are created by die cutting a series of parallelograms in the liner sheet so that when the end of the liner is folded back, the die pattern will leave the v-slot configuration.

Turning now to FIG. 3, shown is the frame of the duct 110 in which the multi-layer duct liner 100 is attached by a series of hooks which are fixedly attached to the duct 110 by their stems, and the hook portion hooks over all of the retaining loops 150 of each layer of the multi-layer duct liner 100 which are exposed through the duct liner lip notches 220 of the duct liner lips 210.

Turning now to FIG. 4, shown is the multi-layer duct liner 100 about to be installed into the duct 110. In an embodiment, the orifice of the duct 110 is lined with fourteen hooks 160. To install the multi-layer duct liner 100, the multi-layer duct liner 100 inserted into the duct 110, and the hooks 160 hook over the retaining loops 150 of each layer of the multi-layer duct liner 100 which are exposed through the duct liner lip notches 220 of the duct liner lips 210.

After the multi-layer duct liner has been installed for some period of time and it is determined that the innermost duct liner should be removed, in one embodiment, the sequence for removal is that the pull lead 170 is tied to the innermost liner retaining loop and pulled tight to close the opening, and then the innermost liner can be knotted for final extraction by pulling the pull lead from the plenum area.

Figure 5:
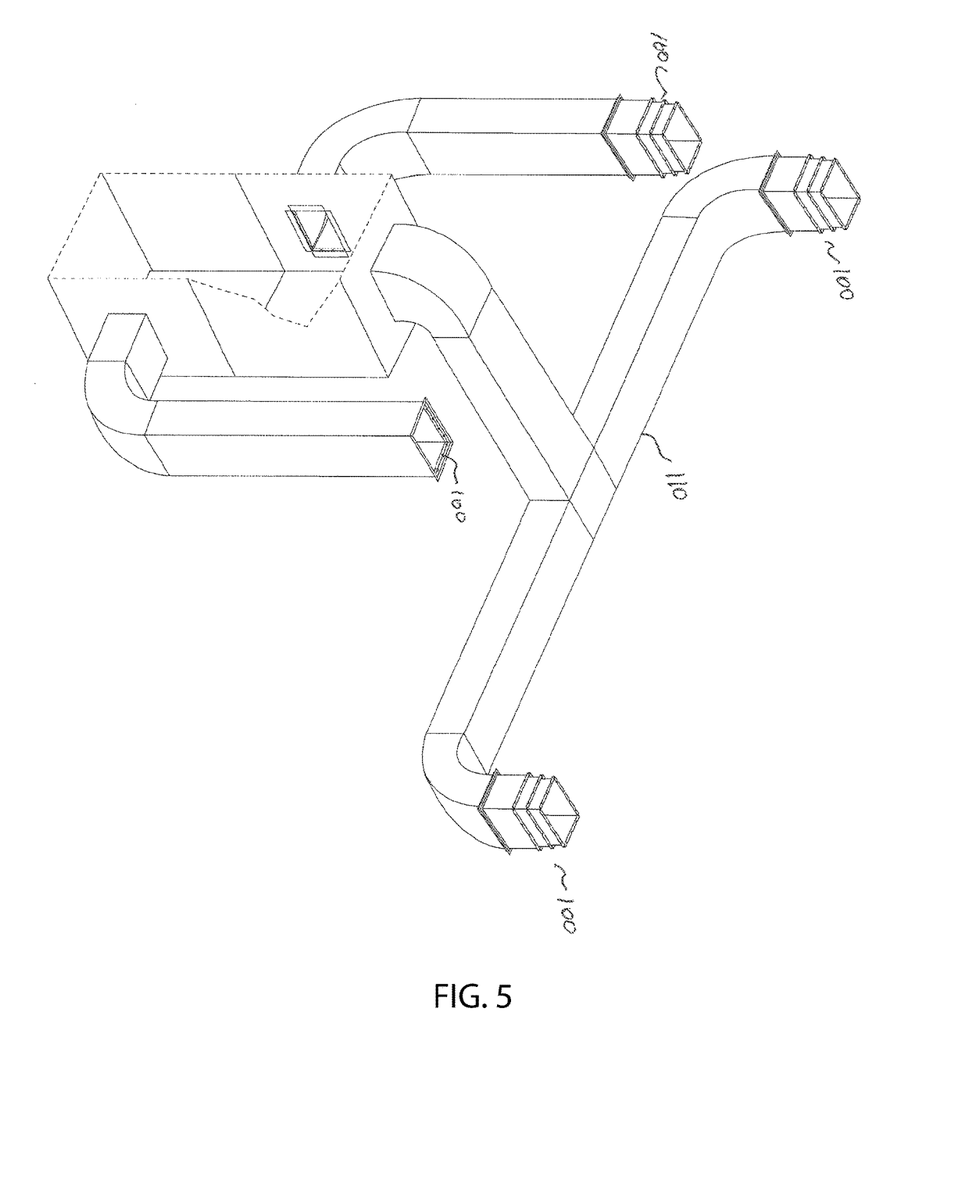
FIG. 5 is diagram of multiple ducts containing multi-layer duct liners.

Turning now to FIG. 5, show is a diagram of multiple ducts containing multi-layer duct liners. Multi-layer duct liners can be placed in duct systems with varying configurations, including T-junctions and Y-junctions.

Figure 6:
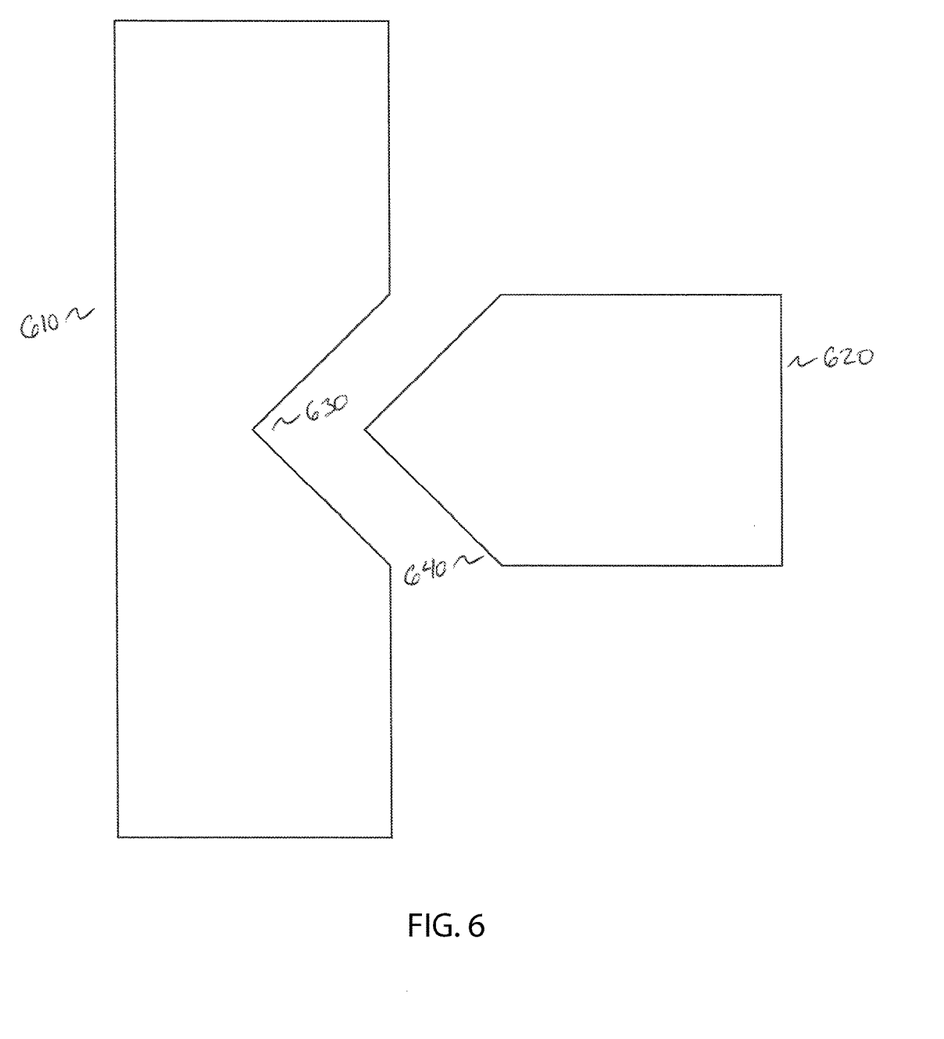
FIG. 6 is a diagram illustrating sheets for a T-junction of a layer of a multi-layer duct liner.

Turning now to FIG. 6, shown is a diagram of a T-junction of a layer of a multi-layer duct liner. The T-junction comprises a bar 610 and a stem 620. Multi-layer duct liners can be placed in systems wherein ducts have T-junctions, such as the duct system in FIG. 5. The T-junction is configured by creating a notch 630 in the bar 610 and an apex 640 in the stem 620. The stem 620 is attached to the bar 610 by adhering the apex 640 to the notch 630. The adhesion may be made by any suitable means, including glue or application of heat to suitable materials.

Figure 7:
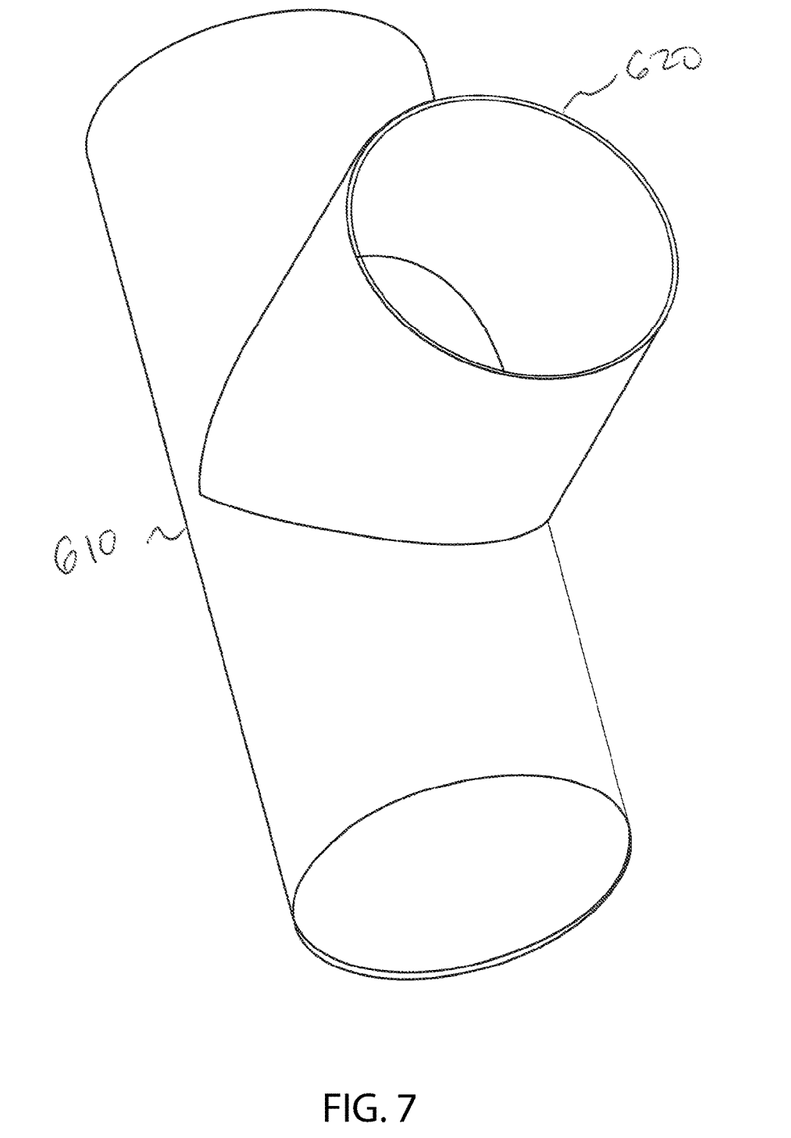
FIG. 7 an oblique view of a T-junction of a layer of a multi-layer duct liner.

Turning now to FIG. 7, shown is an oblique view of a T-junction of a layer of a multi-layer duct liner. If the layer was installed flat into the duct system, upon activation of the system, the pressure in the plenum would inflate the multi-layer duct liner to the dimensions of the duct.

Figure 8:
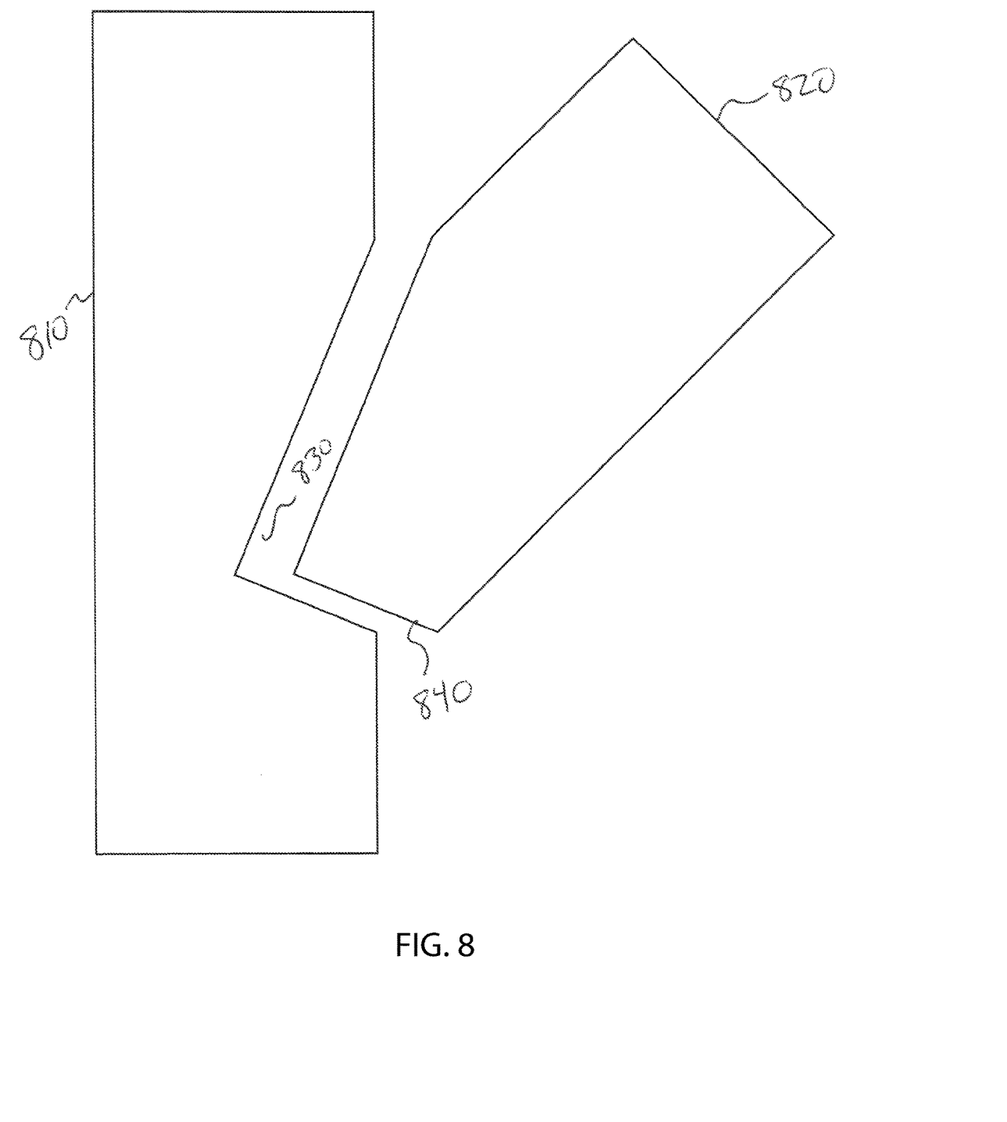
FIG. 8 is a diagram illustrating sheets for a Y-junction of a layer of a multi-layer duct liner.

Turning now to FIG. 8, shown is a diagram of a Y-junction of a multi-layer duct liner. The Y-junction comprises a bar 810 and a stem 820. Multi-layer duct liners can be placed in systems wherein ducts have Y-junctions. The Y-junction is configured by creating a notch 830 in the bar 810 and an apex 840 in the stem 820. The stem 820 is attached to the bar 810 by adhering the apex 840 to the notch 830.

Figure 9:
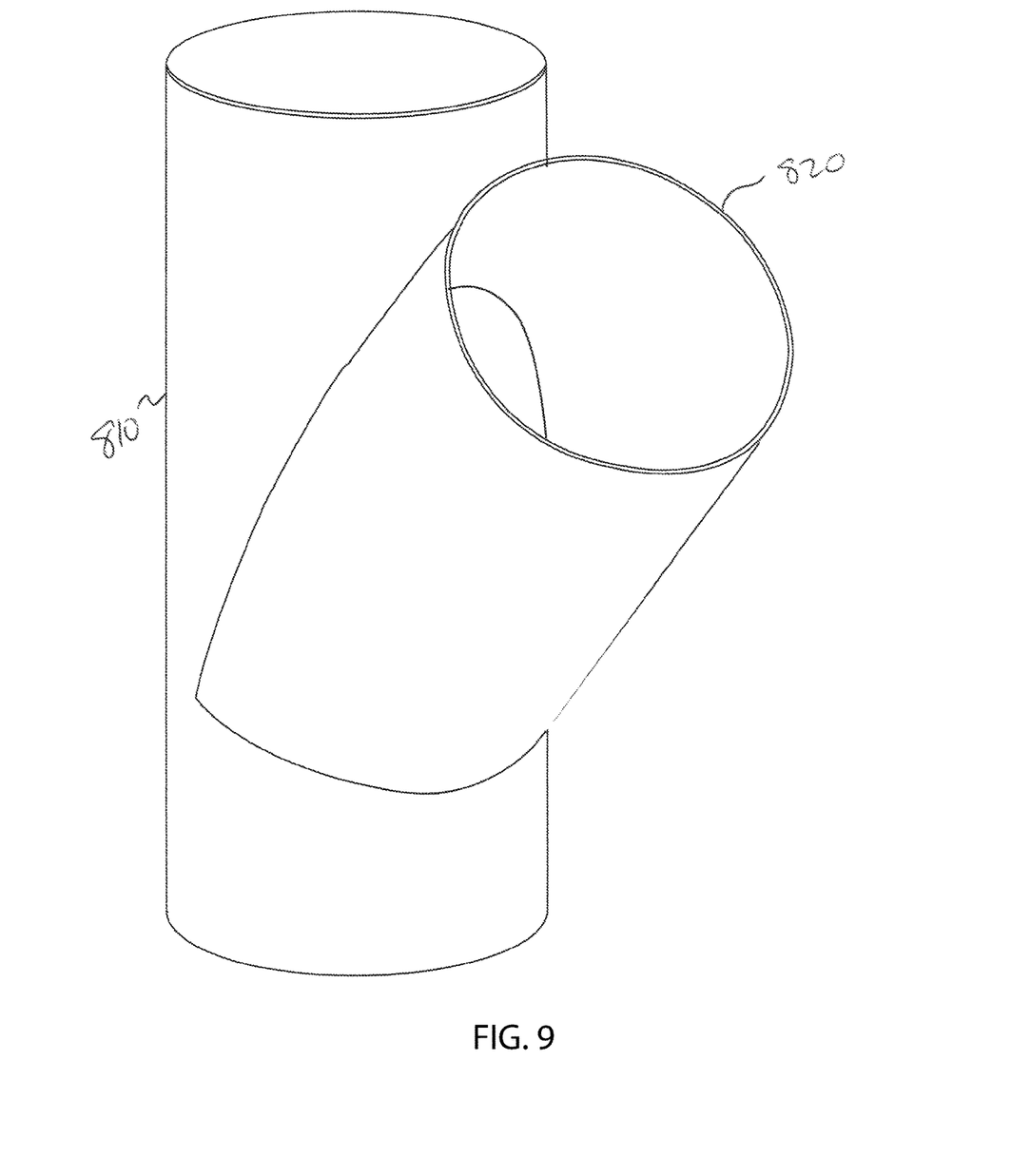
FIG. 9 an oblique view of a Y-junction of a layer of a multi-layer duct liner.

Turning now to FIG. 9, shown is an oblique view of a Y-junction of a layer of a multi-layer duct liner. If the layer was installed flat into the duct system, upon activation of the system, the pressure in the plenum would inflate the multi-layer duct liner to the dimensions of the duct.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A multi-layer duct liner, comprising:
    a plurality of duct liners with outer transverse dimensions of said plurality of duct liners being less than the inner transverse dimension of a host duct system, wherein said plurality of said duct liners are nested within each other from an innermost position to an outermost position, said plurality of duct liners being adapted to be removed singularly in order from said innermost position.

2. The multi-layer duct liner of claim 1, wherein said plurality of said duct liners comprises an outer duct liner and an inner duct liner, wherein said outer duct liner is positioned and wraps around said inner duct liner.

3. The multi-layer duct liner of claim 2 further comprising a medial duct liner positioned between said inner duct liner and said outer duct liner.

4. The multi-layer duct liner of claim 2 further comprising a plurality of medial duct liners positioned between said inner duct liner and said outer duct liner.

5. The multi-layer duct liner of claim 1, wherein each of said plurality of duct liners further comprises a pull lead attached to each of said plurality of duct liners.

6. The multi-layer duct liner of claim 5, wherein a distal end of each of said plurality of pull leads attached to each of said plurality of duct liners is attached to said duct liners at a distal end, and a proximal end of said pull lead is accessible from a proximal end of said duct liner.

7. The multi-layer duct liner of claim 1 further comprising a plurality of retaining loops wherein one of each said plurality of retaining loops is attached to a proximal end and a distal end of each of said plurality of duct liners.

8. The multi-layer duct liner of claim of 7 claim, wherein said plurality of retaining loops are attached to said plurality of duct liners by folding back a portion of said proximal end and said distal end of each of said plurality of duct liners, cutting a series of notches in said proximal end and distal end of each of said plurality of duct liners, placing one of said plurality of retaining loops under each folded portion of said proximal end and said distal end of each of said plurality of duct liners, and affixing each said folded portion of said proximal end and said distal end of each of said plurality of duct liners to the non-folded portion of said proximal end and said distal end of each of said plurality of duct liners such that each of said retaining loops are visible through said notches cut in said proximal end and distal end of each of said plurality of duct liners.

9. The multi-layer duct liner of claim 8 further comprising a plurality of hooks, wherein said hooks are affixed to a proximal end of a duct and a distal end of a duct, wherein said hooks can attach to said plurality of retaining loops attached to said proximal end and said distal end of each of said plurality of duct liners, thereby affixing said multi-layer duct liner to said duct.

10. The multi-layer duct liner of claim 1, wherein said plurality of duct liners are configured with a T-junction.

11. The multi-layer duct liner of claim 1, wherein said plurality of duct liners are configured with a Y-junction.

12. A multi-layer duct liner, comprising:
a plurality of duct liners nested within each other from an innermost position to an outermost position;
a plurality of pull leads wherein each one of said plurality of pull leads is attached to one of said plurality of duct liners, whereby the innermost duct liner of said plurality of duct liners may be removed from a host duct system by pulling on said pull lead attached to said innermost duct liner.

13. The multi-layer duct liner of claim 12, further comprising a duct liner lip at each end of each of said plurality of duct liners.

14. The multi-layer duct liner of claim 13, further comprising a plurality of duct liner lip notches in each of said duct liner lips.

15. The multi-layer duct liner of claim 14, further comprising a retaining loop within each of said duct liner lips.

16. The multi-layer duct liner of claim 15, further comprising a plurality of hooks attached to said host duct system wherein said each of said plurality of hooks attaches to said retaining loops exposed by at least one of said duct liner lip notches.

* * * * *